United States Patent
Shibuya et al.

(10) Patent No.: US 10,935,489 B2
(45) Date of Patent: Mar. 2, 2021

(54) ANALYSIS APPARATUS AND ANALYSIS METHOD

(71) Applicant: HORIBA, Ltd., Kyoto (JP)

(72) Inventors: Kyoji Shibuya, Kyoto (JP); Kensuke Fukushiro, Kyoto (JP); Toshio Ohta, Kyoto (JP); Katsumi Nishimura, Kyoto (JP)

(73) Assignee: HORIBA, LTD., Kyoto (JP)

( * ) Notice: Subject to any disclaimer, the term of this patent is extended or adjusted under 35 U.S.C. 154(b) by 94 days.

(21) Appl. No.: 16/150,948

(22) Filed: Oct. 3, 2018

(65) Prior Publication Data

US 2019/0101491 A1   Apr. 4, 2019

(30) Foreign Application Priority Data

Oct. 3, 2017   (JP) ................. 2017-193619

(51) Int. Cl.
*G01N 21/39*   (2006.01)
*G01N 21/3504*   (2014.01)
(Continued)

(52) U.S. Cl.
CPC ............... *G01N 21/39* (2013.01); *G01J 3/10* (2013.01); *G01J 3/433* (2013.01); *G01J 3/4338* (2013.01);
(Continued)

(58) Field of Classification Search
CPC ....... G01J 2001/4242; G01J 2003/4332; G01J 2003/4334; G01J 3/10; G01J 3/433;
(Continued)

(56) References Cited

U.S. PATENT DOCUMENTS

| 3,588,497 A | 6/1971 | Jordan |
| 3,761,724 A | 9/1973 | Dennis |
| 2011/0310379 A1* | 12/2011 | Byrne ................ G01N 21/3581 356/51 |

(Continued)

FOREIGN PATENT DOCUMENTS

| EP | 3336522 A1 | 6/2018 |
| JP | 2009-047677 A | 3/2009 |

OTHER PUBLICATIONS

K. Namjou et al., Sensitive Absorption Spectroscopy With A Room-temperature Distributed-feedback Quantum-cascade Laser, Optics Letters, Optical Society of America, US, Feb. 1, 1998, vol. 23, No. 3, pp. 219-221.

(Continued)

*Primary Examiner* — Tri T Ton
(74) *Attorney, Agent, or Firm* — Brooks Kushman P.C.

(57) ABSTRACT

The present invention relates to an analysis apparatus adapted to analyze a measurement target component contained in a sample by irradiating a measurement cell into which the sample is introduced with pulse-oscillated light, whereby suppressing reduction in wavelength resolution without shortening the pulse width. The analysis apparatus includes multiple light sources adapted to produce pulse oscillations, a light detector adapted to detect light emitted from the light source and transmitted through the measurement cell, and a signal separation part adapted to separate, from a light intensity signal obtained by the light detector, signals corresponding to a part of pulses from the light sources.

10 Claims, 11 Drawing Sheets

(51) Int. Cl.
*G01J 3/10* (2006.01)
*G01J 3/433* (2006.01)
*G01J 1/42* (2006.01)

(52) U.S. Cl.
CPC .. *G01N 21/3504* (2013.01); *G01J 2001/4242* (2013.01); *G01J 2003/4332* (2013.01); *G01J 2003/4334* (2013.01); *G01N 2021/396* (2013.01); *G01N 2201/12* (2013.01)

(58) Field of Classification Search
CPC ............ G01J 3/4338; G01N 2021/396; G01N 21/3504; G01N 21/39; G01N 2201/12; G01B 11/24; G06K 9/00798; G06K 9/00805; G06T 2207/10021; G06T 2207/30256; G06T 2207/30261; G06T 7/285; G06T 7/521; G06T 7/593; G06T 7/70; G08G 1/165; H04N 13/207; H04N 13/239; H04N 2013/0081

USPC .... 356/432–448, 239.1–239.8, 237.1–237.6, 356/243.1–243.8, 36–28, 335–343
See application file for complete search history.

(56) References Cited

U.S. PATENT DOCUMENTS

| | | | |
|---|---|---|---|
| 2014/0026639 A1* | 1/2014 | Wang | G01N 29/2425 73/24.02 |
| 2017/0003168 A1* | 1/2017 | Fujii | A61B 5/0075 |

OTHER PUBLICATIONS

Rubin Qi et al., Wavelength Modulation Spectroscopy Based on Quasicontinuous-wave Diode Lasers, Chinese Optics Letters, Nov. 18, 2011, vol. 10, No. 3, pp. 033001-1-033001-4.
EESR dated Dec. 10, 2018, issued for European Patent Application No. 18 198 170.5, 15 pgs.

* cited by examiner

ANALYSIS APPARATUS AND ANALYSIS METHOD

CROSS-REFERENCE TO RELATED APPLICATION

This application claims priority to Japanese Application No. JP2017-193619, filed Oct. 3, 2017, the disclosure of which is incorporated in its entirety by reference herein.

TECHNICAL FIELD

The present invention relates to an analysis apparatus and an analysis method used for analysis such as gas component analysis.

BACKGROUND ART

Patent Literature 1 discloses a laser gas analyzer based on the wavelength modulation method (or also referred to as a frequency modulation method) which has been considered as an analysis apparatus using a semiconductor laser. This laser gas analyzer uses an analysis method (TDLAS: Tunable Diode Laser Absorption Spectroscopy) in which a current injected into a semiconductor laser is modulated to sweep an oscillation wavelength of the semiconductor laser and an absorption spectrum of a measurement target component contained in gas is obtained to quantify concentration. In the laser gas analyzer, for enhancement of its detection sensitivity, current modulation having small amplitude at a frequency sufficiently higher than a frequency used to modulate the current for the wavelength sweeping is applied, and the spectrum is obtained from a signal lock-in detected at a frequency twice the sufficiently higher frequency to quantify the concentration.

Then, it has been considered to use a semiconductor laser of a pulse oscillation type as the semiconductor laser in the analysis apparatus so as to conduct analysis through quasi-continuous oscillation (quasi-continuous oscillation method). In the quasi-continuous oscillation method, a semiconductor laser of a pulse oscillation type is adapted to produce oscillation having the shortest pulse width (e.g. approximately several tens ns), and a light detector whose response time is sufficiently slower than the pulse oscillation repeating period and sufficiently faster than the injection current modulating period is used to receive light, whereby obtaining a resultant light intensity signal for analysis in the same manner as the case of using a semiconductor laser of a continuous oscillation type.

CITATION LIST

Patent Literature

Patent Literature 1: Japanese Unexamined Patent Publication JP-A 2009-47677

SUMMARY OF INVENTION

Technical Problem

However, in the analysis apparatus based on the quasi-continuous oscillation method, a transient temperature change occurring within the pulse whose width is as short as, for example, approximately several tens ns causes a wavelength change, thus resulting in reducing spectrum wavelength resolution to be obtained and deteriorating analysis performance in comparison with the case of using a laser of the continuous oscillation type.

Therefore, it is conceivable to shorten the pulse width in order to suppress a reduction in wavelength resolution in the quasi-continuous oscillation method. However, as the pulse width is made shorter, the level of technology required for a driver board to drive a semiconductor laser becomes higher, which increases costs accordingly.

The present invention is made in consideration of the problem as described above, and a desired object thereof is to allow an analysis apparatus based on, for example, the quasi-continuous oscillation method to suppress a reduction in wavelength resolution without shortening the pulse width.

Solution to Problem

That is, the analysis apparatus according to the present invention is one adapted to analyze a measurement target component contained in a sample by irradiating a measurement cell into which the sample is introduced with pulse-oscillated light, and the analysis apparatus includes: at least one light source adapted to produce pulse oscillation; a light detector adapted to detect light emitted from the at least one light source and transmitted through the measurement cell; and a signal separation part adapted to separate, from a light intensity signal obtained by the light detector, a signal corresponding to a part of a pulse from the at least one light source.

The analysis method according to the present invention is also adapted to analyze a measurement target component contained in a sample by irradiating a measurement cell into which the sample is introduced with pulse-oscillated light, the analysis method being characterized by making at least one light source produce pulse oscillation to irradiate the measurement cell with light, using a light detector to detect light transmitted through the measurement cell, and separating, from a light intensity signal obtained by the light detector, a signal corresponding to a part of a pulse from the at least one light source.

According to the present invention, the at least one light source is adapted to produce pulse oscillation to irradiate a measurement cell with light and a signal corresponding to a part of a pulse from the at least one light source is separated from a light intensity signal obtained by the light detector, whereby the pulse width of the pulse oscillation does not directly affect wavelength resolution and therefore a reduction in wavelength resolution can be suppressed without shortening the pulse width. As a result, as compared with a conventional quasi-continuous oscillation method, the wavelength resolution can be significantly improved. In addition, since shortening the pulse width to prevent the reduction in wavelength resolution is not required, the technical degree of difficulty required for a driver board to drive the at least one light source is reduced, and correspondingly, cost is also reduced.

When the semiconductor laser used as the light source produces pulse oscillation, temperature changes to thereby change a wavelength. The degree of such a transient temperature change (wavelength change) becomes smaller toward the latter half of a pulse, and therefore by separating a signal corresponding to the latter half of a pulse, the wavelength resolution is improved. For this reason, it is preferable that the signal separation part separates, from the light intensity signal, a signal corresponding to the latter half of a pulse from the at least one light source. This configuration makes it possible to significantly improve the wavelength resolution as compared with the conventional quasi-continuous oscillation method by relatively widening the pulse width of a pulse (e.g., approximately 100 ns) and setting a sampling point to a time position within the pulse as far back as possible (e.g., 85 to 95 ns after the rise of the pulse).

It is desirable that the at least one light source is adapted to produce pulse oscillation by drive current or drive voltage for pulse oscillation and drive current or drive voltage for wavelength modulation, and an oscillation wavelength is modulated at a predetermined frequency. Specifically, it is desirable that the at least one light source is adapted to produce quasi-continuous oscillation and a temperature change is generated by current modulation to sweep an oscillation wavelength. According to this configuration, as compared with the continuous oscillation, the quasi-continuous oscillation makes it possible to decrease the power consumption of the light source, facilitate waste heat disposal, and further prolong the life of the light source.

To realize the signal separation part in a simple configuration, the signal separation part desirably includes a sample-and-hold circuit adapted to sample and hold a signal corresponding to a part of a pulse from the at least one light source, and an AD converter adapted to perform digital conversion of a signal obtained by the sample-and-hold circuit. Herein, since a signal corresponding to a part of a pulse is separated by the sample-and-hold circuit, the AD converters may have a slow processing speed.

The signal separation part desirably separates, from the light intensity signal, an offset signal obtained in a pulse off time of the at least one light source. According to this configuration, an offset signal from the light detector can be obtained substantially simultaneously with the rise of the pulse, thereby a change in the offset signal due to disturbance can be captured and accurate analysis can be realized. It is also unnecessary to suspend the light source such as a laser of a pulse oscillation type to obtain an offset signal or to provide a light shielding structure for shielding light coming into the light detector.

To conduct several analyses in a short period of time, the analysis apparatus desirably includes multiple light sources adapted to produce pulse oscillations at mutually different timings and sequentially. Specifically, it is conceivable to include, within one period of one of the light sources, one pulse from each of the other light sources.

To make it easier to separate a signal by the signal separation part, the multiple light sources are desirably adapted to produce pulse oscillations so as to prevent pulse-oscillated laser light from overlapping each other.

To make it easier to separate a signal by the signal separation part, the signal separation part is desirably adapted to separate a signal of each of the multiple light sources from the light intensity signal at a timing synchronized with a timing for pulse oscillation of each of the multiple light sources.

To enable multi-component simultaneous measurement and make its signal processing easier, the multiple light sources are desirably adapted to correspond to different measurement target components. Specifically, the multiple light sources have oscillation wavelengths corresponding to respectively different measurement target components.

Advantageous Effects of Invention

According to the present invention as described above, the light source is adapted to produce pulse oscillation to irradiate a measurement cell with light and a signal corresponding to a part of a pulse from the light source is separated from a light intensity signal obtained by the light detector, whereby a reduction in wavelength resolution can be suppressed without shortening the pulse width.

DESCRIPTION OF EMBODIMENTS

In the following, an analysis apparatus 100 according to one embodiment of the present invention will be described with reference to the drawings.

Figure 1:
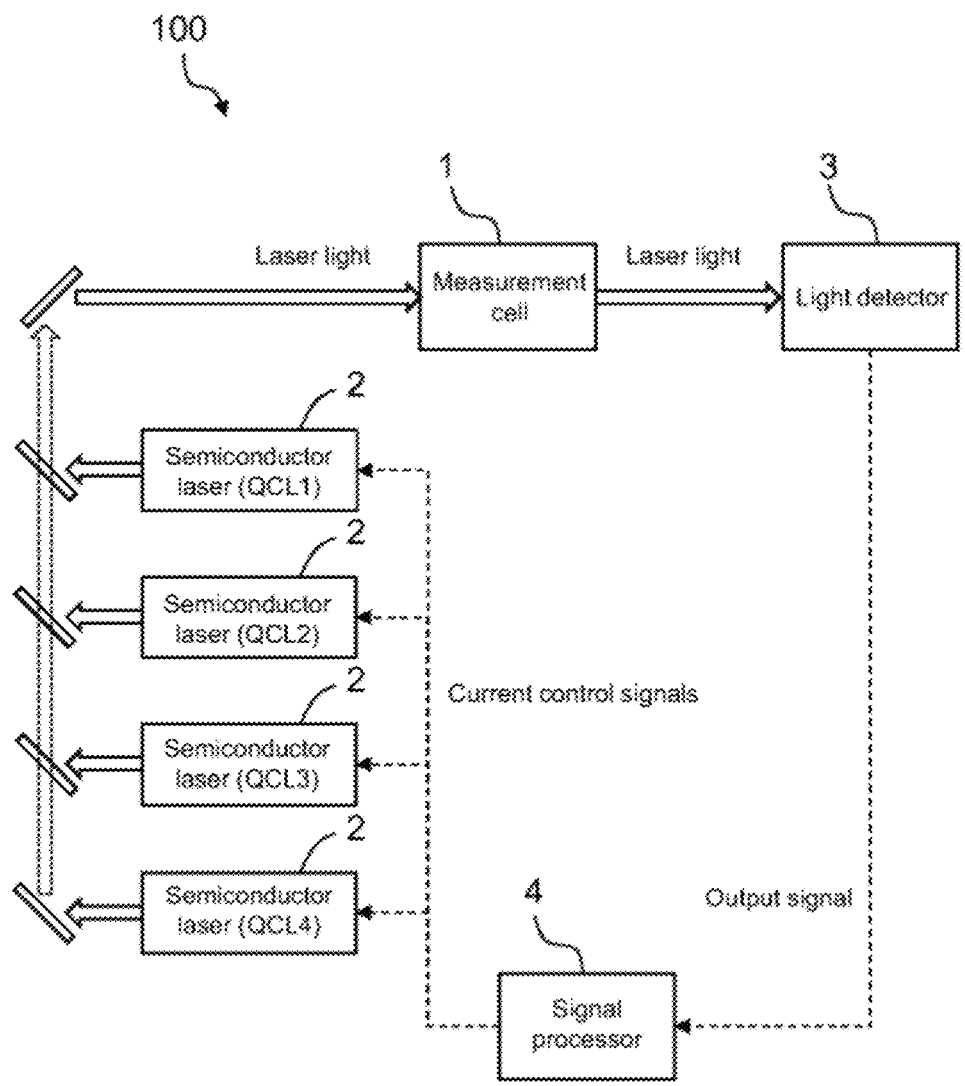
FIG. 1 is an overall schematic diagram of an analysis apparatus according to one embodiment of the present invention.

The analysis apparatus 100 is a concentration measurement apparatus adapted to measure the concentration of a measurement target component (such as CO, $CO_2$ $N_2O$, NO, $NO_2$, $H_2O$, $SO_2$, $CH_4$, or $NH_3$ herein) contained in sample gas such as exhaust gas, and as illustrated in FIG. 1, includes: a measurement cell 1 into which the sample gas is introduced; multiple semiconductor lasers 2 as light sources adapted to irradiate the measurement cell 1 with laser light; a light detector 3 provided in the light path of laser light transmitted through measurement cell 1 and adapted to receive the laser light; and a signal processor 4 adapted to receive a light intensity signal outputted from the light detector 3 and on the basis of the value of the signal, calculate the concentration of the measurement target component.

The respective parts will be described.

The measurement cell 1 is one whose light incident and exit ports are formed of a transparent material hardly absorbing light in the absorption wavelength band of the measurement target component, such as quartz, calcium fluoride, or barium fluoride. Although not illustrated in FIG. 1, the measurement cell 1 is provided with an inlet port for introducing gas inside and an outlet port for discharging internal gas, and the sample gas is introduced into the measurement cell 1 through the inlet port and then enclosed.

The semiconductor lasers 2 are a semiconductor laser of a pulse oscillation type adapted to produce pulse oscillation of laser light in the mid-infrared region (4 μm to 10 μm) using a quantum cascade laser (QCL) herein as a kind of the semiconductor lasers 2. The semiconductor lasers 2 are capable of modulating (changing) the oscillation wavelength depending on a given current (or voltage). Note that as long as pulse oscillation is possible and an oscillation wavelength is variable, another type of laser may be used, and in order to change an oscillation wavelength, some measures may be taken, such as changing the temperature.

As the light detector 3, a highly responsive quantum photoelectric device such as one using HgCdTe, InGaAs, InAsSb, or PbSe is used.

Figure 2:
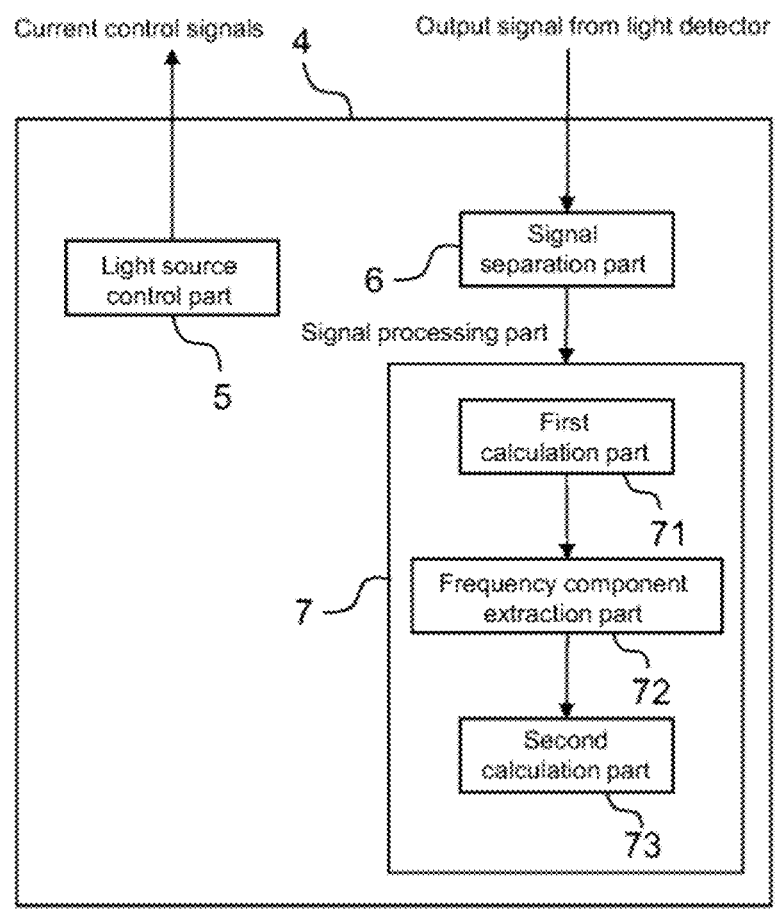
FIG. 2 is a functional block diagram of a signal processor in the same embodiment.

The signal processor 4 is one including: an analog electric circuit including a buffer, an amplifier, and the like; a digital electric circuit including a CPU, a memory, and the like; AD and DA converters acting as interfaces between the analog and digital electric circuits; and the like. Then, the CPU and its peripheral devices cooperate in accordance with a predetermined program stored in a predetermined area of the memory, and thereby as illustrated in FIG. 2, the information processor 4 fulfills functions as a light source control part 5 adapted to control the output of the semiconductor lasers 2, a signal separation part 6 adapted to separate a signal of each of the semiconductor lasers 2 from the light intensity signal obtained by the light detector 3, and a signal processing part 7 adapted to receive signals resulting from the separation by the signal separation part 6 and corresponding to the respective semiconductor lasers 2, and perform a calculation process on the values of the signals to calculate the concentration of the measurement target component.

The respective parts 5 to 7 will be described below in detail.

The light source control part 5 is one adapted to make the respective multiple semiconductor lasers 2 produce pulse oscillations, and modulate the oscillation wavelengths of the laser lights at a predetermined frequency. Also, the light source control part 5 is adapted to control the multiple semiconductor lasers 2 such that the multiple semiconductor lasers 2 have the oscillation wavelengths corresponding to the respectively different measurement target components, and the respective multiple semiconductor lasers 2 produce the pulse oscillations with mutually different oscillation periods at mutually different oscillation timings.

Figure 3:
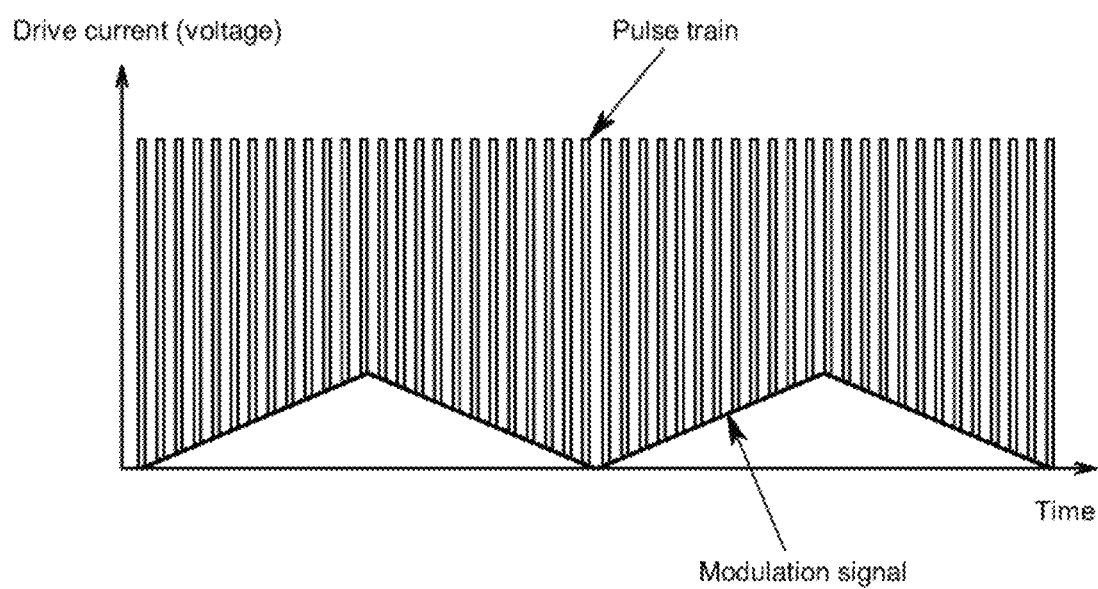
FIG. 3 is a diagram illustrating drive current (voltage) and a modulation signal in the same embodiment.

Specifically, the light source control part 5 outputs current (or voltage) control signals to thereby control the current sources (or the voltage sources) for the respective semiconductor lasers 2, and sets drive currents (or drive voltages) from the current sources (or the voltage sources) to a predetermined threshold value or higher for pulse oscillation. As illustrated in FIG. 3, the light source control part 5 in the present embodiment is one adapted to make the respective semiconductor lasers 2 produce quasi-continuous oscillations (quasi-CWs) as pulse oscillations having a predetermined pulse width (e.g., 10 to 100 ns, duty ratio 5%) and repeated with a predetermined period (e.g., 0.5 to 5 MHz).

Figure 4:
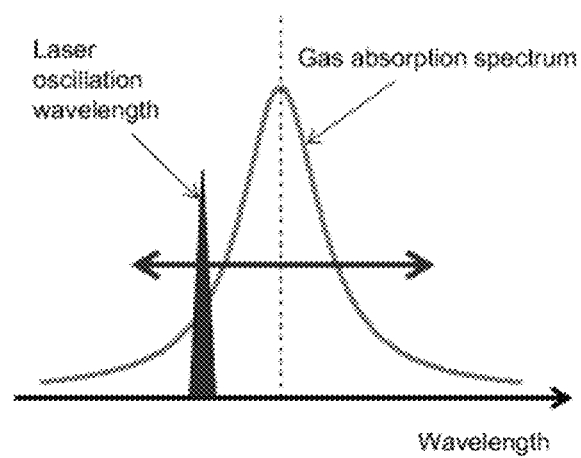
FIG. 4 is a schematic diagram illustrating a method for modulating a laser oscillation wavelength in the same embodiment.

Also, as illustrated in FIG. 3, the light source control part 5 is one adapted to change drive currents (or drive voltages) from the current sources (or the voltage sources) at a predetermined frequency with an amplitude for wavelength sweeping which is less than the threshold value for pulse oscillation, and thereby change temperatures to sweep the oscillation wavelengths of the laser lights. Further, as illustrated in FIG. 4, the oscillation wavelength of the laser light in each of the semiconductor laser is modulated with the peak of the light absorption spectrum of the measurement target component as a center. Modulation signals for changing the drive currents are signals that change in a triangular wave shape, sawtooth wave shape, or sine wave shape, and have a frequency of, for example, 100 to 10 kHz. Note that FIG. 3 illustrates an example where a modulation signal changes in a triangular wave shape.

Figure 5:
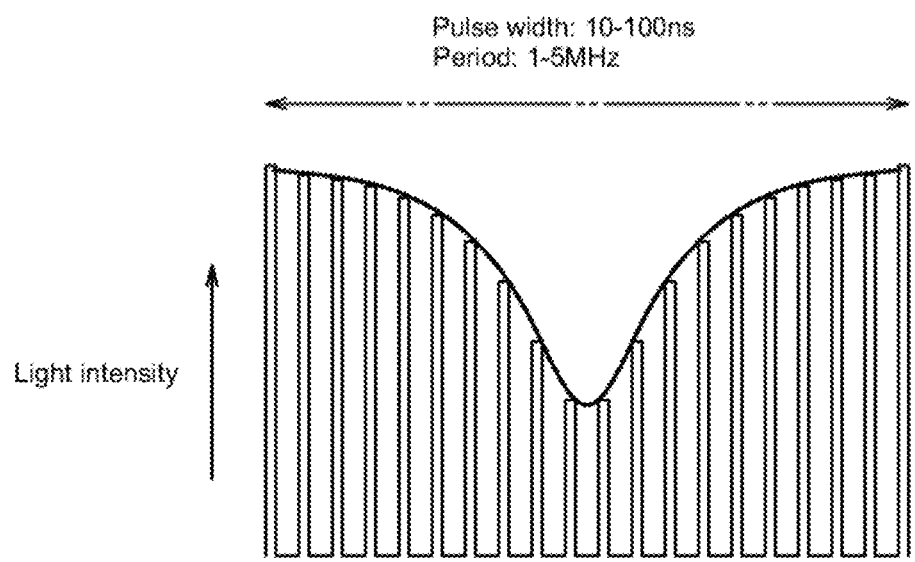
FIG. 5 is a schematic diagram illustrating a measurement principle based on the quasi-continuous oscillation.

The light intensity signal obtained by the light detector 3 as a result of making one of the semiconductor lasers 2 produce the quasi-continuous oscillation in the above manner is as illustrated in FIG. 5. As illustrated, a light absorption spectrum (absorption signal) can be obtained as the entire pulse train.

Figure 6:
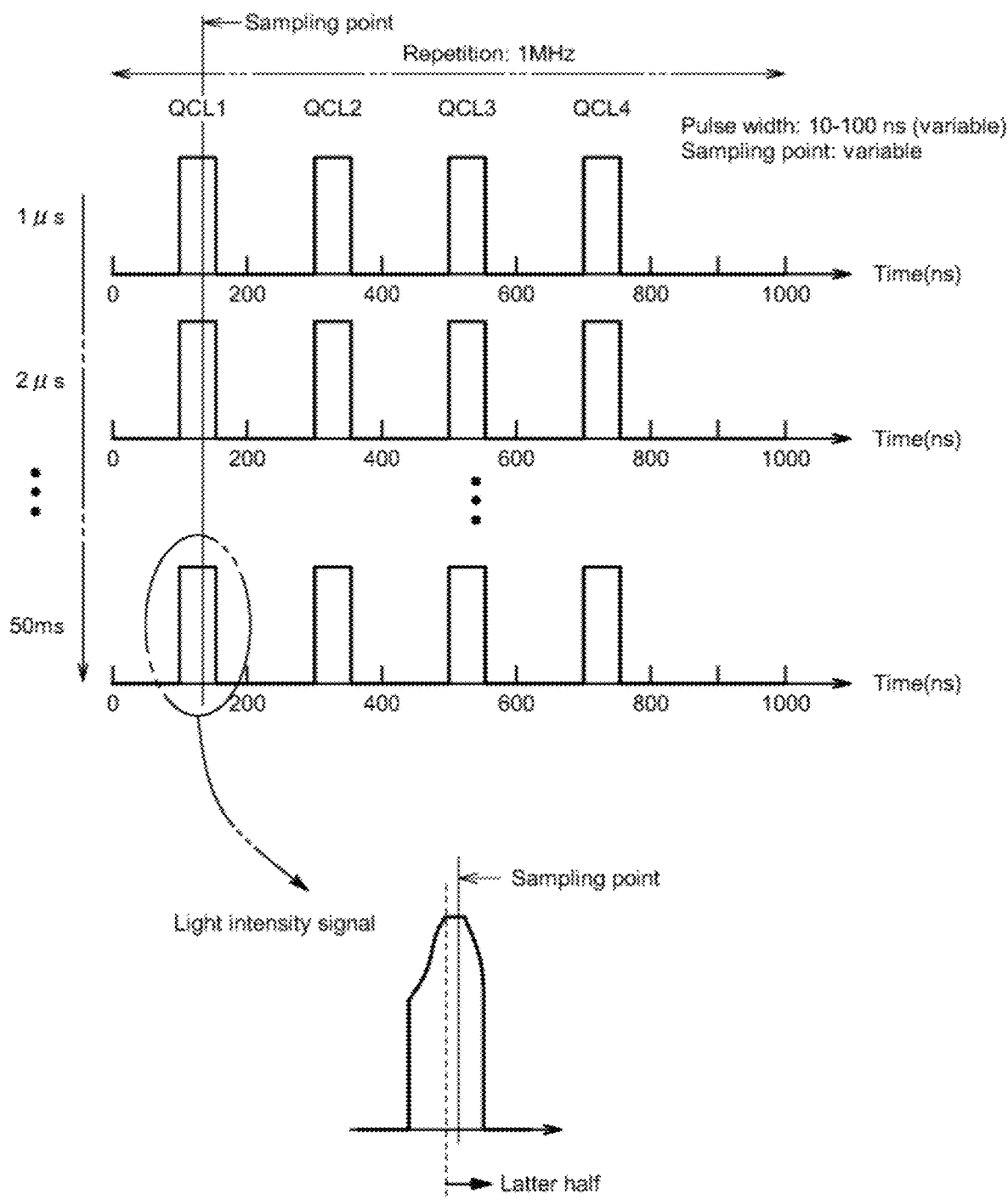
FIG. 6 is a schematic diagram illustrating an example of pulse oscillation timings and light intensity signals of multiple semiconductor lasers in the same embodiment.

Also, the light source control part 5 makes the multiple semiconductor lasers 2 produce the pulse oscillations at the mutually different timings. Specifically, as illustrated in FIG. 6, the multiple semiconductor lasers 2 sequentially produce the pulse oscillations, and within one period of pulse oscillation produced by one of the semiconductor lasers 2, one pulses from the other semiconductor lasers 2 are included. That is, between mutually adjacent pulses from one of the semiconductor lasers 2, one pulses from the other semiconductor lasers 2 are included. In this case, pulses from the multiple semiconductor lasers 2 are oscillated so as to prevent the overlap of the pulses.

Figure 7:
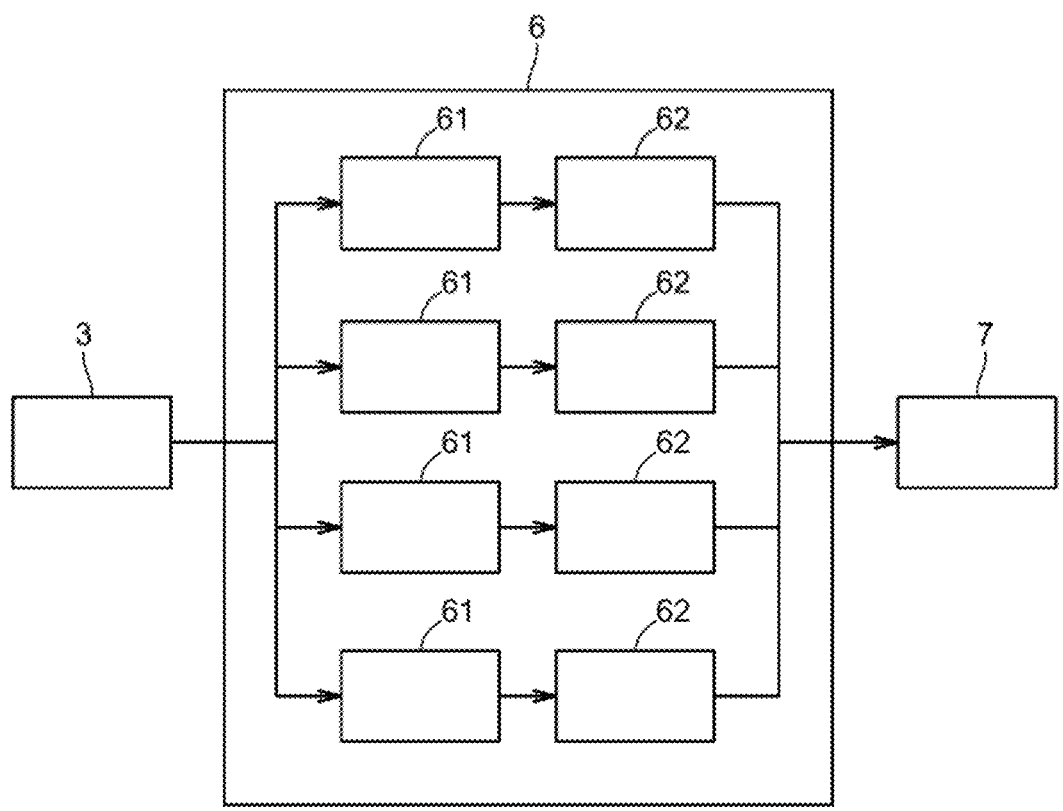
FIG. 7 is a schematic diagram illustrating the configuration of a signal separation part in the same embodiment.

The signal separation part 6 is one adapted to separate the signals corresponding to the respective multiple semiconductor lasers 2 from the light intensity signal obtained by the light detector 3. As illustrated in FIG. 7, the signal separation part 6 in the present embodiment includes: multiple sample-and-hold circuits 61 provided corresponding to the respective multiple semiconductor lasers 2; and AD converters 62 adapted to perform digital conversion of light intensity signals resulting from separation by the sample-and-hold circuits 61. Note that one sample-and-hold circuit 61 and one AD converter 62 may be commonly shared by the multiple semiconductor lasers 2.

Figure 8:
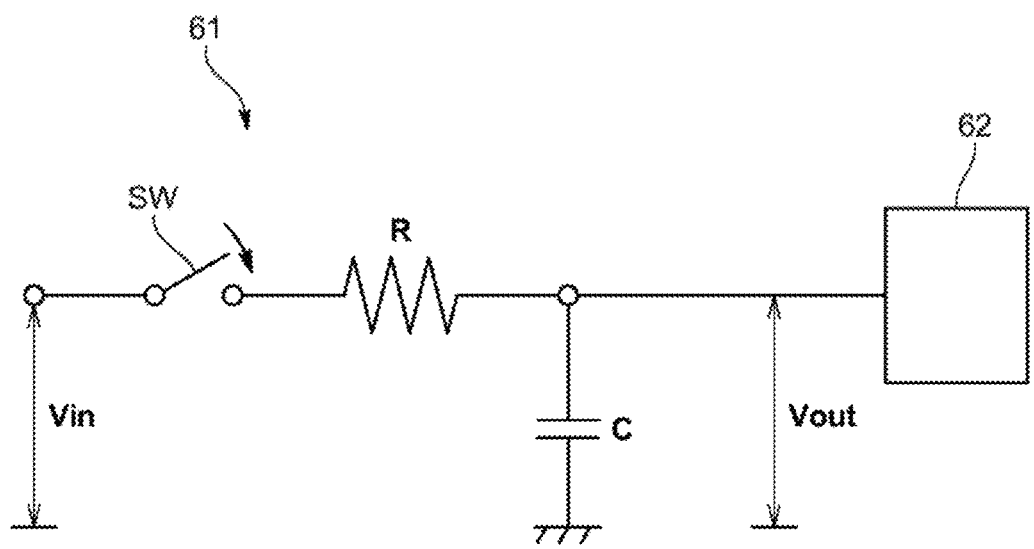
FIG. 8 is a diagram illustrating an example of a sample-and-hold circuit in the same embodiment.

Each of the sample-and-hold circuits 61 uses a sampling signal synchronized with a current (or a voltage) control signal for a corresponding semiconductor laser 2 to, at timing synchronized with timing at which the semiconductor laser 2 produces pulse oscillation, separate a signal corresponding to the semiconductor laser 2 from the light intensity signal obtained by the light detector 3, and holds the signal. FIG. 8 shows, without limitation, an example of the sample-and-hold circuits 61. Note that the sample-and-hold circuit 61 is configured to separate and hold a signal corresponding to the latter half of a pulse from the semiconductor laser 2. Specifically, timing to open/close a switch SW of the sample-and-hold circuit 61 is synchronized with the timing at which the semiconductor laser 2 produces pulse oscillation so as to hold a signal corresponding to the latter half of the pulse. In addition, as illustrated in FIG. 6, each of the sample-and-hold circuits 61 separates a signal at a predetermined sampling point in the latter half (e.g., around 80 to 90 ns). One light absorption spectrum is obtained from collection of multiple signals corresponding to the respective semiconductor lasers 2 and resulting from the separation by the signal separation part 6 and better wavelength resolution can be obtained in the above-mentioned one light absorption spectrum than a light absorption spectrum obtained when one semiconductor laser 2 is made to produce the quasi-continuous oscillation. Multiple absorption spectra obtained for the respective semiconductor lasers 2 may also be time-averaged for use. Since each of the sample-and-hold circuits 61 separates a signal corresponding to a part of a pulse, the AD converters 62 may have even slow processing speed.

The signal processing part 7 calculates the concentrations of the measurement target components corresponding to the respective semiconductor lasers 2 using absorption spectra from signals resulting from the separation by the signal separation part 6 and corresponding to the respective semiconductor lasers 2.

Specifically, the signal processing part 7 includes a first calculation part 71, a frequency component extraction part 72, a second calculation part 73, and the like.

The first calculation part 71 is one adapted to calculate the logarithm of the ratio (hereinafter also referred to as an intensity ratio logarithm) between the light intensity of the laser light (hereinafter also referred to as measurement target light) having been transmitted through the measurement cell 1 in a state where the sample gas is enclosed and light is absorbed by the measurement target component of the sample gas and the light intensity of laser light (hereinafter also referred to as reference light) having been transmitted through the measurement cell 1 in a state where light absorption is substantially zero.

Describing more specifically, both of the former and latter light intensities are measured by the light detector 3, the resulting pieces of measurement result data are stored in a predetermined area of the memory, and the first calculation part 71 refers to the pieces of measurement result data to calculate the intensity ratio logarithm.

In addition, the former measurement (hereinafter also referred to as sample measurement) is of course performed on every sample gas. The latter measurement (hereinafter also referred to as reference measurement) may be performed any of before and after every sample measurement, or may be performed, for example, once at appropriate timing, and the result of the measurement may be stored in the memory and used in common for every sample measurement. Note that, in the sample measurement and the reference measurement, absorption spectra of the respective semiconductor lasers 2 are obtained by the light source control part 5 and the signal separation part 6 as described above to calculated intensity ratio logarithms of the respective semiconductor lasers 2.

Note that in this embodiment, in order to obtain the state where light absorption is substantially zero, zero gas whose light absorption is substantially zero in a wavelength band where the measurement target component absorbs light, for example, $N_2$ gas is enclosed in the measurement cell 1; however, another gas may be enclosed, or the measurement cell 1 may be evacuated.

The frequency component extraction part 72 is one adapted to lock-in detect the intensity ratio logarithm (hereinafter also referred to as an absorbance signal) calculated by the first calculation part 71 with a reference signal having a frequency n times (n is an integer equal to or more than 1) the modulation frequency, and extract a frequency component having the frequency of the reference signal from the intensity ratio logarithm. Note that the lock-in detection may be performed by digital calculation or by calculation through an analog circuit. Also, the frequency component may be extracted using not only the lock-in detection but also a method such as Fourier series expansion.

The second calculation part 73 is one adapted to, on the basis of the result of the detection by the frequency component extraction part 72, calculate the concentration of the measurement target component.

Next, an example of the operation of the analysis apparatus 100 will be described while describing the respective parts above in detail.

First, as described above, the light source control part 5 controls the multiple semiconductor lasers 2 to modulate the wavelength of the laser light at the modulation frequency with the peak of the absorption spectrum of the measurement target component as a center.

Then, when zero gas is enclosed in the measurement cell 1 by an operator or automatically, the first calculation part 71 having sensed the enclosure performs the reference measurement.

Figure 9:
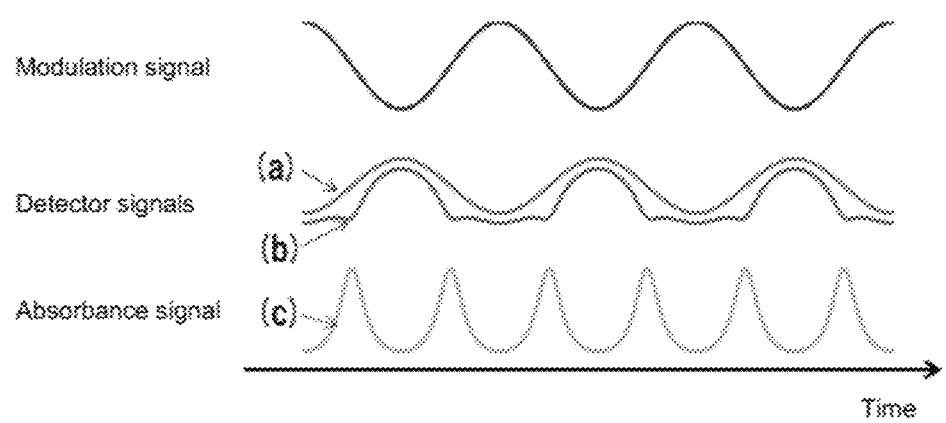
FIG. 9 is a time-series graph illustrating an example of a modulation signal, output signals from a light detector, and a measurement result in the same embodiment.

Specifically, the signal separation part 6 receives output signals from the light detector 3 in a state where the zero gas is enclosed in the cell 1, and separates signals corresponding to the respective semiconductor lasers 2. The signal processing part 7 stores the values of the signals in the memory. When displaying the values of the signals from the respective semiconductor lasers 2 in the reference measurement, i.e., reference light intensity in a time-series graph, a curve as illustrated in (a) of FIG. 9 is obtained. That is, only a change in light output caused by the modulation of the laser drive current (voltage) is displayed as the output signal from the light detector 3.

Subsequently, when the sample gas is enclosed in the measurement cell 1 by the operator or automatically, the first calculation part 71 performs the sample measurement. Specifically, the signal separation part 6 receives output signals from the light detector 3 in a state where the sample gas is enclosed in the cell 1, and separates signals corresponding to the respective semiconductor lasers 2. The signal processing part 7 stores the values of the signals in a measurement result data storage part. The signal processing part 7 stores the values in a predetermined area of the memory. When displaying the values of the signals from the respective semiconductor lasers 2 in the sample measurement, i.e., measurement target light intensity in a time-series graph, a curve as illustrated in (b) of FIG. 9 is obtained. It turns out that an absorption peak appears in every half period of the modulation.

After that, the first calculation part 71 synchronizes respective pieces of measurement data with the modulation period, and calculates the intensity ratio logarithm between the light intensity of the measurement target light and the light intensity of the reference light. Specifically, the first calculation part 71 performs the calculation in accordance with the following expression (Expression 1).

$$A(t) = -\ln\left(\frac{D_m(t)}{D_z(t)}\right) \qquad \text{[Expression 1]}$$

Here, $D_m(t)$ represents the measurement target light intensity, $D_z(t)$ the reference light intensity, and $A(t)$ the intensity ratio logarithm (absorbance signal). When displaying the absorbance signal in the graph with the horizontal axis as time, a curve as illustrated in (c) of FIG. 9 is obtained.

The intensity ratio logarithm calculation may be performed by calculating the ratio between the measurement target light intensity and the reference light intensity and then obtaining the logarithm of the ratio, or obtaining the logarithm of the measurement target light intensity and the logarithm of the reference light intensity, and then obtaining the difference between them.

Then, the frequency component extraction part 72 lock-in detects the intensity ratio logarithm with the reference signal having the frequency twice the modulation frequency, i.e., extracts the frequency component having the frequency twice the modulation frequency, and stores the resulting data (hereinafter also referred to as lock-in data) in a predetermined area of the memory. Note that the lock-in data may also be obtained from the difference in the lock-in detected logarithm between the measurement target light intensity and the reference light intensity.

The value of the lock-in data is a value proportional to the concentration of the measurement target component, and the second calculation part 73 calculates, on the basis of the value of the lock-in data, a concentration indicated value indicating the concentration of the measurement target component.

In such a configuration, even when laser light intensity varies due to some cause, a constant offset is only added to the above-described intensity ratio logarithm but a waveform does not change. Accordingly, the value of each frequency component calculated by lock-in detecting the intensity ratio logarithm added with the constant offset does not change, and a concentration indicated value also does not change, therefore making it possible to expect accurate measurement.

Describing the reason for this in detail, it is as follows.

In general, when developing the absorbance signal A(t) into a Fourier series, it is expressed by the following expression (Expression 2).

In addition, in the expression (Expression 2), $a_n$ represents a value proportional to the concentration of the measurement target component, and on the basis of the value $a_n$, the second calculation part 73 calculates the concentration indicated value indicating the concentration of the measurement target component.

$$A(t) = a_0 + \sum_{n=1}^{\infty} a_n \cos(2\pi n f_m t + \phi_n) \quad \text{[Expression 2]}$$

Here, $f_m$ represents the modulation frequency, and n represents a multiple of the modulation frequency.

On the other hand, A(t) is also expressed by the above expression (Expression 1).

Next, an absorbance signal A'(t) obtained when the laser light intensity varies $\alpha$ times due to some cause during the measurement is expressed by the following expression (Expression 3).

$$A'(t) = -\ln\left(\frac{\alpha D_m(t)}{D_z(t)}\right) = -\ln\left(\frac{D_m(t)}{D_z(t)}\right) - \ln(\alpha) = A(t) - \ln(\alpha) \quad \text{[Expression 3]}$$

As is clear from this expression (Expression 3), A'(t) is equal to the absorbance signal A(t), which is a signal in the absence of a variation in the laser light intensity, only added with $-\ln(\alpha)$ as a constant value, and therefore it turns out that even when the laser light intensity changes, the value $a_n$ of each frequency component does not change.

Accordingly, the concentration indicated value determined on the basis of the value of the frequency component having the frequency twice the modulation frequency is not affected.

The above is the example of the operation of the analysis apparatus 100 at the time when the sample gas does not contain an interference component other than the measurement target component.

Next, an example of the operation of the present analysis apparatus 100 at the time when at least one interference component (e.g., H$_2$O) absorbing light at the peak light absorption wavelength of the measurement target component is contained in the sample gas will be described.

First, a principle will be described.

Since the light absorption spectrum of the measurement target component and the light absorption spectrum of the interference component are different in shape, absorbance signals obtained when the respective components are independently present are different in waveform, and therefore the ratios of respective frequency components are different (linearly independent). By utilizing this and solving simultaneous equation using the relationship between the values of respective frequency components of measured absorbance signals and preliminarily obtained respective frequency components of absorbance signals of the measurement target component and the interference component, the concentration of the measurement target component, from which the interference effect has been corrected, can be obtained.

Given that absorbance signals per unit density obtained when the measurement target component and the interference component are independently present are respectively represented by $A_m(t)$ and $A_i(t)$, and respective frequency components of the absorbance signals are represented by $a_{nm}$ and $a_{ni}$, the following expressions (Expressions 4 and 5) hold.

$$A_m(t) = a_{0m} + \sum_{n=1}^{\infty} a_{nm} \cos(2\pi n f_m t + \phi_n) \quad \text{[Expression 4]}$$

$$A_i(t) = a_{0i} + \sum_{n=1}^{\infty} a_{ni} \cos(2\pi n f_m t + \phi_n) \quad \text{[Expression 5]}$$

An absorbance signal value A(t) obtained when the measurement target component and the interference component are present at concentrations of $C_m$ and $C_i$, respectively is expressed by the following expression (Expression 6) on the basis of the linearities of the respective absorbances.

$$\begin{aligned} A(t) = & \; C_m A_m(t) + C_i A_i(t) \quad \text{[Expression 6]} \\ = & \; C_m\left(a_{0m} + \sum_{n=1}^{\infty} a_{nm}\cos(2\pi n f_m t + \phi_n)\right) + \\ & \; C_i\left(a_{0i} + \sum_{n=1}^{\infty} a_{ni}\cos(2\pi n f_m t + \phi_n)\right) \\ = & \; a_{0m}C_m + a_{0i}C_i + \\ & \; \sum_{n=1}^{\infty} (a_{nm}C_m + a_{ni}C_i)\cos(2\pi n f_m t + \phi_n) \end{aligned}$$

Given here that frequency components of A(t) at $f_m$ and $2f_m$ are respectively represented by $a_1$ and $a_2$, the following simultaneous equations (Expression 7) hold from the above expression (Expression 6).

$$a_{1m}C_m + a_{1i}C_i = a_1$$

$$a_{2m}C_m + a_{2i}C_i = a_2 \quad \text{[Expression 7]}$$

The frequency components $a_{nm}$ and $a_{ni}$ (n is a natural number and n=1, 2 herein) respectively obtained when the measurement target component and the interference component are independently present can be preliminarily obtained by making corresponding span gases flow, and therefore simple and certain calculation, i.e., solving the above simultaneous equations (Expression 7) allows the concentration $C_m$ of the measurement target gas, from which the interference effect has been eliminated, to be determined.

The analysis apparatus 100 operates on the basis of the above-described principle.

That is, the analysis apparatus 100 in this case stores, in a predetermined area of the memory, the frequency components $a_{1m}$, $a_{2m}$, $a_{1i}$, and $a_{2i}$ (independent frequency components in claims) of the absorbance signals obtained by some means such as preliminarily making measurements while making corresponding span gases flow when the measurement target component and the interference component are independently present. Specifically, as in the above example, for each of the measurement target component and the interference component, the measurement target light intensity and the reference light intensity are measured to calculate the intensity ratio logarithm (absorbance signal) between them, and from the intensity ratio logarithm, the frequency components $a_{1m}$, $a_{2m}$, $a_{1i}$, and $a_{2i}$ are obtained by the lock-in detection or another means and then stored. Note that it may be adapted not to store the frequency components but to store the absorbance signals per unit concentration $A_m(t)$ and $A_i(t)$ (independent logarithmic intensity ratios in claims), and calculate the frequency components $a_{1m}$, $a_{2m}$, $a_{1i}$, and $a_{2i}$ from the above expression (Expression 4).

Then, the analysis apparatus 100 specifies the measurement target component and the interference component by inputs from an operator or the like.

Subsequently, the first calculation part 71 calculates the intensity ratio logarithm $A(t)$ in accordance with the above expression (Expression 1).

After that, the frequency component extraction part 72 lock-in detects the intensity ratio logarithm with reference signals respectively having the modulation frequency $f_m$ and the frequency $2f_m$ twice the modulation frequency $f_m$ to extract the respective frequency components $a_1$ and $a_2$ (pieces of lock-in data), and stores them in the predetermined area of the memory.

Then, the second calculation part 73 substitutes the values of the pieces of lock-in data $a_1$ and $a_2$ and the values of the frequency components $a_{1m}$, $a_{2m}$, $a_{1i}$, and $a_{2i}$ stored in the memory into the above-expression (Expression 7), or performs equivalent calculation to calculate concentration (or a concentration indicated value) $C_m$ indicating the concentration of the measurement target gas, from which the interference effect has been removed. At this time, the concentration (concentration indicated value) $C_i$ of each interference component may be calculated.

Note that even when two or more interference components can be assumed to be present, by adding higher order frequency components whose number corresponds to the number of the interference components and solving simultaneous equations where the number of unknowns is equal to the number of components, the concentration of the measurement target component, from which the interference effect has been removed, can be determined.

That is, in general, when the total number of gas components existing in the combination of measurement target components and interference components is n, given that the frequency component of the k-th gas component at $i \times f_m$ is represented by $a_{ik}$, and the concentration of the k-th gas component is represented by $C_k$, the following expression (Expression 8) holds.

$$a_{11}C_1 + a_{12}C_2 + a_{13}C_3 + \cdots + a_{1n}C_n = a_1 \quad \text{[Expression 8]}$$
$$a_{21}C_1 + a_{22}C_2 + a_{23}C_3 + \cdots + a_{2n}C_n = a_2$$
$$a_{31}C_1 + a_{32}C_2 + a_{33}C_3 + \cdots + a_{3n}C_n = a_3$$
$$\vdots$$
$$a_{n1}C_1 + a_{n2}C_2 + a_{n3}C_3 + \cdots + a_{nn}C_n = a_n$$

By solving the simultaneous equations with n unknowns expressed by this expression (Expression 8), the concentrations of gas components in the measurement target components and the interference components can be determined.

Also, it may be adapted to add a higher harmonic component of an order higher than n to prepare simultaneous equations where the number of unknowns is larger than the number of gas components, and determine the concentrations of the respective gas components using the least squares method. In doing so, the concentrations can be determined with errors due to measurement noise being small.

Note that when the measurement target components and interference components are combined to calculate the concentrations of the total of the n gas components, and there are some gas components whose concentrations are equal to or less than a predetermined threshold value, it is conceivable to recalculate the concentrations of the respective gas components other than the gas components having concentrations equal to or less than the threshold value.

Figure 10:
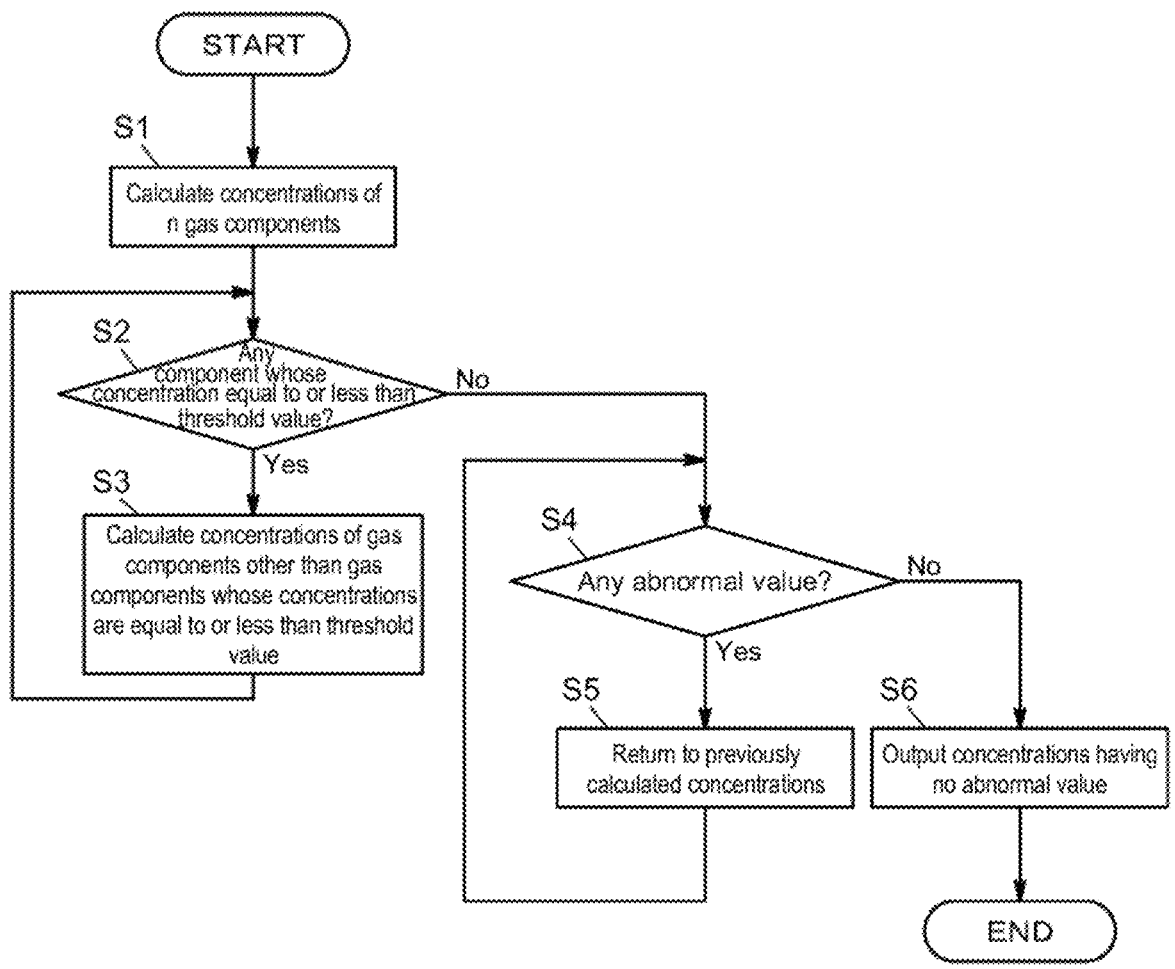
FIG. 10 is a flowchart illustrating concentration calculation in a variation.

Specifically, as illustrated in FIG. 10, the second calculation part 73 solves the simultaneous equations with n unknowns expressed by the above expression (Expression 8) to calculate the concentrations of the n components (S1). Then, a determination part provided in the signal processing part 7 determines whether or not there is any gas component whose concentration is equal to or less than the predetermined threshold value (S2). When there are j components whose concentrations are equal to or less than the threshold value, the second calculation part 73 recalculates the concentrations of (n−j) gas components other than the j gas components whose concentrations are equal to or less than the threshold value using simultaneous equations with (n−j) unknowns expressed on the basis of the same idea as for the above expression (Expression 8) (S3). This makes it possible to accurately calculate the concentrations of the existing gas components. The above series of calculation is repeated until no component whose concentration is equal to or less than the threshold value is detected, or the concentration of the measurement target component is repeatedly calculated a predetermined number of times.

In addition, as operation after it has been determined that no component whose concentration is equal to or less than the threshold value is left, for example, an embodiment adapted to determine whether or not any of calculated concentrations has an abnormal value can be cited (S4). In S4, when there is an abnormal value, the second calculation part 73 checks previously calculated concentrations (S5) to determine whether or not any of the previously calculated concentration has an abnormal value. On the other hand, in S4, when there is no abnormal value, the concentrations not exhibiting any abnormal value are outputted (S6).

According to the analysis apparatus of the present embodiment, the measurement cell 1 is irradiated with laser lights by making the multiple semiconductor lasers 2 produce pulse oscillations at mutually different oscillation timings, and signals corresponding to the respective semiconductor lasers 2 are separated from the light intensity signal obtained by the light detector 3, whereby analysis of multiple measurement target components can be carried out efficiently by the single analysis apparatus 100 using the multiple semiconductor lasers 2.

Note that the present invention is not limited to the above-described embodiment.

For example, even though the above-described embodiment is adapted to modulate oscillation wavelengths in the semiconductor lasers 2, oscillation wavelengths may be fixed in the semiconductor lasers 2.

Additionally, even though the above-described embodiment is adapted to make the respective semiconductor lasers 2 produce quasi-continuous oscillations, the respective semiconductor lasers 2 may simply produce pulse oscillations.

Further, even though the above-described embodiment is adapted to provide the signal separation part 6 using an analog electric circuit (i.e., the sample-and-hold circuit 61), the signal separation part 6 may include a digital electric circuit. In this case, it is conceivable to convert the light intensity signal from the light detector 3 into a digital signal by the AD converter, after which sample signals synchronized with pulse oscillations of the respective semiconductor lasers 2 are sampled and separated from the digital signal.

Besides, in addition to the above-described embodiment, the signal separation part 6 may also separate offset signals obtained in a pulse off time of the multiple semiconductor lasers 2 from the light intensity signal obtained by the light detector 3. Then, the signal processing part 7 uses the offset signals to correct the light intensity signal from the light detector 3 in the reference measurement and the sample measurement. In such an embodiment, the offset signals from the light detector 3 can be obtained substantially simultaneously with pulse oscillations, whereby a change in the offset signals due to disturbance can be captured and accurate analysis can be realized. It is also unnecessary to suspend the semiconductor lasers 2 to obtain offset signals or to provide a light shielding structure for shielding light coming into the light detector 3.

Further, even though the above-described embodiment is adapted to make the multiple light sources produce pulse oscillations with the same oscillation period, these light sources may produce pulse oscillations with mutually different oscillation periods.

Even though the above-described embodiment is adapted to measure the concentrations of the multiple measurement target components contained in sample gas using the multiple semiconductor lasers, other measurement items may also be measured in addition to the concentrations of the measurement target components using the multiple semiconductor lasers.

Even though the above-described embodiment is adapted to include the multiple light sources, only one light source may be provided. Even in this case, the signal separation part separates signals in synchronization with pulse oscillation produced by the one light source.

Also, the sample gas is not limited to the exhaust gas but may be the air, liquid, or solid. In that sense, when the measurement target component is not only gas, but liquid or solid, the present invention is applicable as well. In addition, the present invention is applicable not only to the absorbance of light having been transmitted through the measurement target but also to absorbance calculation based on reflection.

Light sources adapted to produce pulse oscillations that are different from each other may also be used to analyze the identical measurement target component. This enables a further reduction of the interference effect by increasing the amount of information.

Each light source is also not limited to the semiconductor laser, but may be another type of laser, and any light source may be used as long as the light source is a single wavelength light source having a half width enough to ensure measurement accuracy and can be subjected to wavelength modulation.

Although the above embodiment includes the sample-and-hold circuits and the AD converters, there may also be a configuration without having the sample-and-hold circuits as long as the AD converters have a sample-and-hold function.

Figure 11:
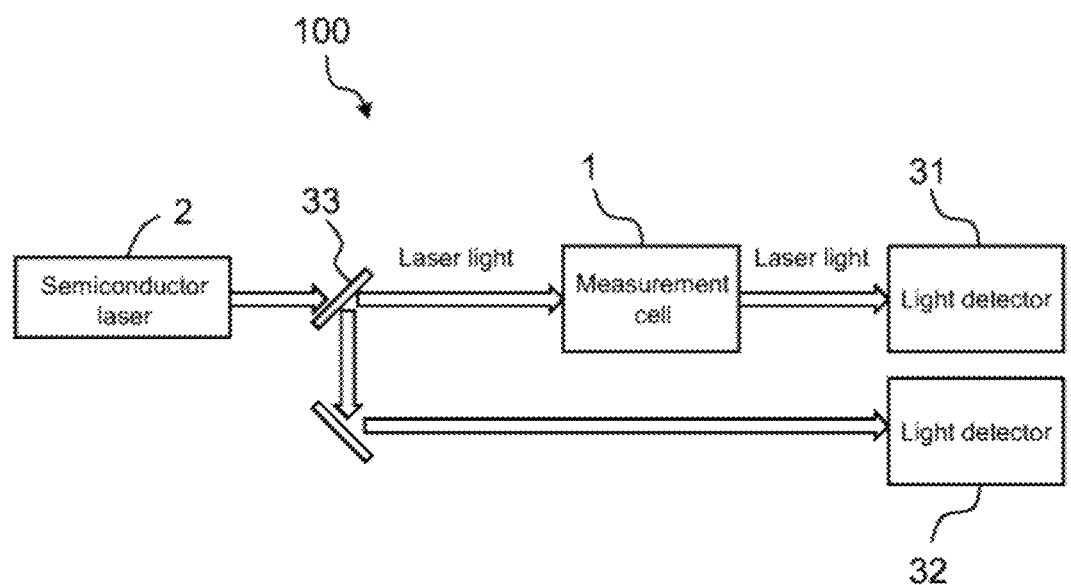
FIG. 11 is a schematic diagram illustrating main parts of an analysis apparatus in a variation.

Although sample measurement and reference measurement are performed by the one light detector in the above embodiment, two light detectors 31, 32 may also be used as shown in FIG. 11 with the one light detector 31 used for sample measurement and the other light detector 32 used for reference measurement. In this case, light from the light source 2 is made to branch off by half mirrors 33. A reference cell may also be provided on a light path in the reference measurement. Note that zero gas or reference gas with known concentration can be enclosed in the reference cell.

Besides, various embodiments may be modified and/or combined without departing from the scope of the present invention.

REFERENCE SIGNS LIST

100: Analysis apparatus
1: Measurement cell
2: Light source (semiconductor laser)
3: Light detector
6: Signal separation part

The invention claimed is:

1. An analysis apparatus adapted to analyze a measurement target component contained in a sample by irradiating a measurement cell into which the sample is introduced, the analysis apparatus comprising:
  at least one semiconductor laser adapted to produce, via first drive current or drive voltage, pulse-oscillated laser light defining pulses in which an oscillation wavelength changes during a time width of at least some of the pulses and to modulate, via second drive current or drive voltage, the oscillation wavelength of the pulse-oscillated laser light according to a modulation signal;
  a light detector adapted to detect the pulse-oscillated laser light emitted from the at least one semiconductor laser and transmitted through the measurement cell; and
  a signal separation part adapted to separate, from a light intensity signal obtained by the light detector, a signal corresponding to a part of a pulse of the pulse-oscillated laser light.

2. The analysis apparatus according to claim 1, wherein the signal separation part is one adapted to separate, from the light intensity signal, a signal corresponding to a latter half of a pulse of the pulse-oscillated laser light.

3. The analysis apparatus according to claim 1, wherein multiple signals resulting from the separation by the signal separation part are collected to provide one light absorption spectrum.

4. The analysis apparatus according to claim 1, wherein the signal separation part comprises:
a sample-and-hold circuit adapted to sample and hold a signal corresponding to a part of a pulse of the pulse-oscillated laser light; and
an AD converter adapted to perform digital conversion of a signal obtained by the sample-and-hold circuit.

5. The analysis apparatus according, to claim 1, wherein the signal separation part is adapted to separate, from the light intensity signal, an offset signal obtained in a pulse off time of the at least one semiconductor laser.

6. The analysis apparatus according to claim 1, wherein the at least one semiconductor laser comprises multiple semiconductor lasers; and
the analysis apparatus comprises multiple semiconductor lasers adapted to produce pulse-modulated laser light at mutually different timings and sequentially.

7. The analysis apparatus according to claim 6, wherein the multiple semiconductor lasers are adapted to produce pulse-oscillated laser light to prevent pulse overlap.

8. The analysis apparatus according to claim 6, wherein the signal separation part separates a signal of each of the multiple semiconductor lasers from the light intensity signal at a timing synchronized with a timing for pulse oscillation of each of the multiple semiconductor lasers.

9. The analysis apparatus according to claim 6, wherein the multiple semiconductor lasers have oscillation wavelengths corresponding to respectively different measurement target components.

10. An analysis method adapted to analyze a measurement target component contained in a sample by irradiating a measurement cell into which the sample is introduced, the analysis method comprising:
producing, via first drive current or drive voltage to at least one semiconductor laser, pulse-oscillated laser light defining pulses in which an oscillation wavelength changes during a time width of at least some of the pulses, and modulating, via second drive current or drive voltage to the at least one semiconductor laser, the oscillation wavelength of the pulse-oscillated laser light according to a modulation signal to irradiate the measurement cell;
using a light detector to detect the pulse-oscillated laser light transmitted through the measurement cell; and
separating, from a light intensity signal obtained by the light detector, a signal corresponding to a part of a pulse of the pulse-oscillated laser light.

* * * * *